United States Patent
Sixt et al.

(10) Patent No.: US 8,779,054 B2
(45) Date of Patent: Jul. 15, 2014

(54) AQUEOUS CROSSLINKABLE DISPERSIONS BASED ON ORGANOSILICON COMPOUNDS

(75) Inventors: Torsten Sixt, Mehring (DE); Jens Lambrecht, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/991,514

(22) PCT Filed: Dec. 6, 2011

(86) PCT No.: PCT/EP2011/071901
§ 371 (c)(1),
(2), (4) Date: Jun. 4, 2013

(87) PCT Pub. No.: WO2012/076518
PCT Pub. Date: Jun. 14, 2012

(65) Prior Publication Data
US 2013/0253129 A1    Sep. 26, 2013

(30) Foreign Application Priority Data
Dec. 10, 2010  (DE) .......................... 10 2010 062 839

(51) Int. Cl.
*C08K 3/36* (2006.01)
*C08G 77/26* (2006.01)

(52) U.S. Cl.
USPC .......................................... 524/588; 528/38

(58) Field of Classification Search
USPC ........................................................ 524/588
See application file for complete search history.

(56) References Cited

U.S. PATENT DOCUMENTS

| | | |
|---|---|---|
| 4,221,688 A | 9/1980 | Johnson et al. |
| 4,427,811 A | 1/1984 | Elias et al. |
| 5,004,771 A | 4/1991 | Feder et al. |
| 5,162,429 A | 11/1992 | Burns et al. |
| 7,541,405 B2 * | 6/2009 | Gottschalk-Gaudig et al. ............................ 524/559 |
| 2004/0131527 A1 | 7/2004 | Gottschalk-Gaudig et al. |
| 2004/0220419 A1 | 11/2004 | Gottschalk-Gaudig et al. |
| 2008/0064813 A1 * | 3/2008 | Schneider ...................... 524/837 |
| 2009/0227792 A1 * | 9/2009 | Briehn et al. ................... 544/229 |

FOREIGN PATENT DOCUMENTS

| | | |
|---|---|---|
| EP | 0365439 A1 | 4/1990 |
| EP | 1473296 A1 | 11/2004 |
| EP | 1433749 B1 | 4/2006 |

OTHER PUBLICATIONS

Gerhard Lagaly, Oliver Schulz, Ralf Zimehl (and Abstract), Dispersionen und Emulsionen, 1997, pp. 1-4, ISBN 3-7985-1087-3, Steinkopff, Darmstadt, Germany.
D. R. Lloyd, Th. C. Ward, H. P. Schreiber, "Analysis of Solid Surface Modification", Inverse Gaschromatography—Characterisation of Polymers and Other Materials, ACS Symposium Series 391, 1989, Chapter 18, pp. 248-261, American Chemical Society, Washington DC, ISBN 0-8412-1610-X.
George W. Sears, "Determination of Specific Surface Area of Colloidal Silica by Titration with Sodium Hydroxide", Analytical Chemistry, 1956, pp. 1981-1983, vol. 28, No. 12, Wilmington, Del.
Edward W. Washburn, "The Dynamics of Capillary Flow", The Physical Review, Mar. 1921, pp. 273-283, vol. 17, No. 3.
Richard Lucas (and Abstract), "Ueber das Zeitgesetz des kapillaren Aufstiegs von Fluessigkeiten" Kolloid Z. Apr. 23, 1918, pp. 15-22.
Joachim Schoelkopf et al, "Measurement and Network Modeling of Liquid Permeation into Compacted Mineral Blocks", Journal of Colloid and Interface Science 227, Copyright 2000 Academic Press, pp. 119-131.

* cited by examiner

*Primary Examiner* — Randy Gulakowski
*Assistant Examiner* — Christopher M Rodd
(74) *Attorney, Agent, or Firm* — Brooks Kushman P.C.

(57) ABSTRACT

Aqueous emulsions curable to elastomeric solids are preparable without the use of an organic emulsifier, and may be prepared to the exclusion of organic solvents.

10 Claims, 1 Drawing Sheet

AQUEOUS CROSSLINKABLE DISPERSIONS BASED ON ORGANOSILICON COMPOUNDS

CROSS-REFERENCE TO RELATED APPLICATIONS

Figure 1:
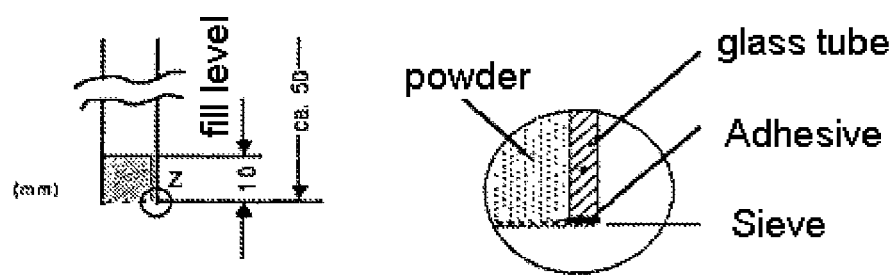

This application is the U.S. national phase of PCT Appln. No. PCT/EP2011/066783 filed Sep. 27, 2011 which claims priority to German application 10 2010 042 352.1 filed Oct. 12, 2010, the disclosures of which are incorporated in their entirety by reference herein.

BACKGROUND OF THE INVENTION

1. Field of the Invention

The invention relates to aqueous dispersions based on organosilicon compounds that can be converted into elastomers or resins following removal of water, to processes for preparing them, and to the use thereof as sealing, adhesive and coating materials.

2. Description of the Related Art

On environmental protection grounds it is appropriate to omit volatile organic constituents from chemical preparations. For this reason, the use of aqueous systems is experiencing continual increase.

Aqueous dispersions of polymers, especially those which can be converted into elastomers or resins following removal of water, are long-established. They consist essentially of a linear polymer, an emulsifier, and water. Also known, furthermore, is the addition of further substances such as crosslinkers, adhesion promoters, crosslinking catalysts, and nonreinforcing fillers. Polymers used are those having reactive end groups. Either the completed polymers can be processed directly to an emulsion, using water and emulsifier, or starting materials for the polymers are emulsified first of all, possibly followed, if desired, by an emulsion polymerization, an emulsion polycondensation, an emulsion polyaddition, or radiation-initiated or thermally initiated crosslinking. The polymer emulsion may then be mixed with a crosslinker component and catalysts, in each case in bulk or in the form of an emulsion, and also with further constituents, such as fillers, adhesion promoters, etc.

Aqueous dispersions of organopolysiloxanes have to date been stabilized generally by means of organic emulsifiers. Cationic, anionic, ampholytic and nonionic emulsifiers are all used. An exemplary specification that may be mentioned here includes EP 365 439 A.

U.S. Pat. No. 4,221,688 and U.S. Pat. No. 4,427,811 describe silicone polymer emulsions which cure to elastomers on removal of water and are stabilized by anionic emulsifiers. These emulsions further comprise colloidal silicon dioxide for the purpose of enhancing the mechanical properties. In U.S. Pat. No. 5,162,429, moreover, silicone polymer emulsions are described that consist of a polymer emulsion stabilized with anionic emulsifier and fumed silica dispersion stabilized with anionic emulsifier, in water. The fumed silica in that case serves as a reinforcing filler.

For areas of application where surface-active substances, such as emulsifiers, alter the typical silicone properties, no suitable solution has yet been disclosed, since aqueous systems fundamentally include such emulsifiers at present. These substances have consequences for surface properties as well, such as for the wettability, for example.

SUMMARY OF THE INVENTION

The invention provides aqueous, crosslinkable dispersions preparable using (A) organosilicon compounds comprising units of the formula $$R_a(OR^1)_b SiO_{(4-a-b)/2} \quad (I),$$

where
R denotes identical or different SiC-bonded hydrocarbon radicals having 1 to 18 carbon atoms, which are optionally substituted by halogen atoms, amino groups, ether groups, ester groups, epoxy groups, mercapto groups, cyano groups or (poly)glycol radicals, the latter being composed of oxyethylene and/or oxypropylene units,
$R^1$ may be identical or different and denotes hydrogen or optionally substituted hydrocarbon radical which may be interrupted by oxygen atoms,
a is 0, 1, 2, or 3, preferably 1 or 2, and
b is 0, 1, 2, or 3, preferably 0, 1, or 2,
with the proviso that the sum of a+b is less than or equal to 4,
(B) silicon dioxide particles which are partly wettable with water,
(C) water,
(D) organosilicon compound(s) comprising at least one unit of the formula $$[A-CR^3{}_2]_e SiR^2{}_c Y_d O_{(4-c-d-e)/2} \quad (II),$$

where
A may be identical or different and denotes an organic radical bonded via nitrogen,
$R^2$ denotes identical or different, monovalent, optionally substituted hydrocarbon radicals,
$R^3$ may be identical or different and represents hydrogen or monovalent, optionally substituted hydrocarbon radicals,
Y may be identical or different and denotes a hydrolyzable radical,
c is 0, 1, 2, or 3, preferably 0, 1, or 2, more preferably 0 or 1,
d is 0, 1, 2, or 3, preferably 2 or 3, and
e is 0, 1, or 2, preferably 0 or 1, with the proviso that the sum of c+d+e is ≤4 and the organosilicon compound has at least one unit where e is other than 0, and also, at least two radicals Y, preferably at least three radicals Y,
and also, optionally,
(E) further substances.

DETAILED DESCRIPTION OF THE PREFERRED EMBODIMENTS

The dispersions of the invention preferably are substantially free from conventional liquid and solid, purely organic, surface-active substances that are nonparticulate at room temperature under the pressure of the surrounding atmosphere, such as nonionic, cationic, anionic, and amphoteric emulsifiers ("organic emulsifiers").

Nonparticulate emulsifiers here means no particles and colloids, but rather molecules and polymers, in line with the definition of molecules, polymers, colloids, and particles as given in Dispersionen and Emulsionen, G. Lagaly, O, Schulz, R. Zindel, Steinkopff, Darmstadt 1997, ISBN 3-7985-1087-3, pages 1-4.

Generally speaking, these organic emulsifiers have a size of less than 1 nm, a molar mass <10 000 g/mole, a carbon content >50 wt %, determinable by elemental analysis, and also a Mohs hardness of less than 1.

At the same time, the emulsifiers of which the dispersions of the invention are substantially free usually have a solubility in water at 20° C. under the pressure of the surrounding atmosphere, i.e. 900 to 1100 hPa, homogeneously or in the form of micelles, of greater than 1 wt %.

The dispersions of the invention may comprise such organic emulsifiers up to a maximum weight fraction, based on the total weight of the dispersion of the invention, of less than 10 wt %, preferably less than 2 wt %, more preferably less than 1 wt %, more particularly 0 wt %.

The component (A) used in accordance with the invention is preferably liquid at room temperature under the pressure of the surrounding atmosphere, in other words between 900 and 1100 hPa, and preferably has a viscosity of 1 to 10,000,000 mPas, more preferably 100 to 500,000 mPas, and most preferably 1000 to 100,000 mPas, in each case at 25° C.

The organosilicon compounds (A) used in accordance with the invention may comprise not only silanes, i.e. compounds of the formula (I) with a+b=4, but also siloxanes, i.e. compounds comprising units of the formula (I) with a+b≤3. The organosilicon compounds used in accordance with the invention and comprising units of the formula (I) are preferably oligomeric or polymeric organosiloxanes, which may be linear, branched or cyclic, more particularly those which consist of units of the formula (I).

Examples of hydrocarbon radicals R are alkyl radical such as the methyl, ethyl, n-propyl, isopropyl, 1-n-butyl 2-n-butyl, isobutyl, tert-butyl, n-pentyl, isopentyl, neopentyl, and tert-pentyl radicals; hexyl radical such as the n-hexyl radical; heptyl radical such as the n-heptyl radical; octyl radicals such as the n-octyl radical and isooctyl radicals such as the 2,2,4-trimethylpentyl radical;
nonyl radicals such as the n-nonyl radical; decyl radicals such as the n-decyl radical; dodecyl radicals such as the n-dodecyl radical; octadecyl radicals such as the n-octadecyl radical, alkenyl radicals such as the vinyl and the allyl radicals; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals such as the benzyl radical and the α- and the β-phenylethyl radicals.

Examples of substituted hydrocarbon radicals R are halogenated radicals such as the 3-chloropropyl radical, the 3,3,3-trifluoropropyl radical, chlorophenyl radicals, hexafluoropropyl radicals such as the 1-trifluoromethyl-2,2,2-trifluoroethyl radical; the 2-(perfluorohexyl)ethyl radical, the 1,1,2,2-tetrafluoroethyloxypropyl radical, the 1-trifluoromethyl-2,2,2-trifluoroethyloxypropyl radical, the perfluoroisopropyloxyethyl radical, the perfluoro-isopropyloxypropyl radical; radicals substituted by amino groups, such as the N-(2-aminoethyl)-3-aminopropyl radical, the 3-aminopropyl radical, the 3-(cyclohexylamino)propyl radical, the aminomethyl radical, the cyclohexylaminomethyl radical, alkyl- or arylamino methyl radicals with alkyl or aryl radicals having 1-18 carbon units, and the diethylaminomethyl radical; ether-functional radicals, such as the 3-methoxypropyl radical, the methoxymethyl radical, the 3-ethoxypropyl radical, and the acetoxymethyl radical; cyano-functional radicals, such as the 2-cyanoethyl radical; ester-functional radicals, such as the methacryloyloxypropyl radical; epoxy-functional radicals, such as the glycidyloxypropyl radical; and sulfur-functional radicals, such as the 3-mercaptopropyl radical.

Preferred radicals R are hydrocarbon radicals having 1 to 10 carbon atoms, where more preferably at least 80%, more particularly at least 90%, of the radicals R are methyl radicals.

Examples of radicals $R^1$ are the examples specified for radical R.

Preferred radicals $R^1$ are hydrogen and alkyl groups having 1 to 6 carbon atoms, more preferably hydrogen and methyl and ethyl radicals, and most preferably hydrogen.

Examples of component (A) are α,ω-dihydroxypolydimethylsiloxanes having 30 to 2000 siloxy units, α,ω-dialkoxypolydimethylsiloxanes or polydimethylsiloxanes having dialkoxysilyl or trialkoxysilyl end groups, and branched organopolysiloxanes having organyloxy functions and/or OH functions comprising T and/or Q units.

As component (A) it is preferred to use substantially linear siloxanes having a molar fraction of branchings, i.e. of T and/or Q units, of less than 10%.

More preferably, organosilicon compounds (A) used in accordance with the invention are substantially linear, OH-terminated and/or alkoxy-terminated organopolysiloxanes, yet more preferably α,ω-dihydroxydiorganopolysiloxanes, and most preferably α,ω-dihydroxydiorganopolysiloxanes having a viscosity of 1000 to 100,000 mPas at 25° C.

Component (A) comprises substances which are available commercially and/or may be prepared by methods common within organic and/or organosilicon chemistry.

Component (B) used in accordance with the invention comprises silicon dioxide particles which are in part wettable with water, i.e. which are not completely wettable with water and not completely water-unwettable.

The particles (B) used in accordance with the invention preferably have an average diameter of greater than 1 nm, preferably of 1 to 5000 nm, more preferably 10 to 1000 nm, yet more preferably 100 to 600 nm, and especially from 150 nm to 500 nm, in each case measured preferably by means of dynamic light scattering (in accordance with ISO 13320: 2009, for example with a Malvern Zetasizer Nano ZS).

The particles (B) preferably have a specific BET surface area of 30 to 500 m$^2$/g, more preferably 100 to 300 m$^2$/g. The BET surface area is measured according to known methods, preferably in accordance with Deutsche Industrie Norm DIN 66131 and DIN 66132.

The particles (B) preferably have a carbon content of less than 50 weight percent, more preferably 0.01 to 20 weight percent, and most preferably 0.02-5 weight percent.

The component (B) preferably comprises particles having a contact angle THETA of 0 to 180°, more preferably 30 to 150°, and most preferably 45 to 135°, measured in each case at the water/air phase boundary at a temperature of 25° C. under the pressure of the surrounding atmosphere, i.e. at between 900 and 1100 hPa. The contact angle THETA is measured according to known methods, preferably determined on a pressed compact of component (B) against water, with the digital image analysis of the substrate/water contact angle taking place with double-distilled water (in accordance with DIN EN 828, using, for example, Dataphysics OCA 15 EC).

The particles (B) preferably have a surface energy gamma of 30 to 72.5 mJ/m$^2$ at a temperature of 25° C. under the pressure of the surrounding atmosphere, i.e. of between 900 and 1100 hPa.

The particles (B) used in accordance with the invention preferably have a dispersion fraction of the surface energy, gamma-s-D, of 40 to 80 mJ/m$^2$, preferably 50 to 70 mJ/m$^2$, more preferably 60 to 70 mJ/m$^2$, at a temperature of 25° C. under the pressure of the surrounding atmosphere, i.e. of between 900 and 1100 hPa. The dispersion fraction of the surface energy, gamma-s-D, is measured for example in accordance with "Inverse Gaschromatography"—"Characterization of Polymers and other Materials", 391 ACS Symposium Series, D. R. Lloyd, Th C. Ward, H. P. Schreiber, chapter 18, pp 248-261, ACS, Washington D.C. 1989, ISBN 0-8412-1610-X.

The silicon dioxide (B) used in accordance with the invention may be wet-chemically prepared silicon dioxide, for example precipitated silicas or silica gels, or silicon dioxide prepared in elevated-temperature operations, for example pyrogenically prepared silicon dioxides or silicas, with component (B) preferably being pyrogenically prepared silicon dioxide.

The preferred starting silica from which the partly water-wettable silica used in the dispersions of the invention is prepared may be prepared by any desired way known per se, such as in a flame reaction from halogen-silicon compounds, for example from silicon tetrachloride or halogen-organosilicon compounds such as methylchlorosilanes, such as methyltrichlorosilane, or hydrogenchlorosilanes such as hydrogentrichlorosilane or other hydrogenmethyl-chlorosilanes, such as hydrogenmethyldichlorosilane, or alkylchlorosilanes, also in a mixture with hydrocarbons, or any desired sprayable and, preferably, volatilizable mixtures of organosilicon compounds, as specified, and hydrocarbons, and in this case the flame may be a hydrogen-oxygen flame or else a carbon monoxide-oxygen flame. The preparation of the silica may in this case take place optionally with and without additional addition of water, in the purification step, for example; it is preferred not to add water.

Preferably used as component (B) in the preparation of the dispersions of the invention are partly hydrophobized, more preferably partly silylated, particulate solids, more particularly those which carry OH groups on their surface.

Partially silylated here means that neither the whole particle surface area is unsilylated, nor is the entire particle surface silylated.

The occupancy τ of the surface of the particulate solids by silylating agent radicals here, based on the overall particle surface area, is preferably 5% to 95%, more preferably 5% to 50%, more particularly 10% to 30%.

This occupancy by silylating agent may be determined for example by means of elemental analysis, such as via the carbon content, for example, or by determining the residual amount of reactive surface OH groups on the particulate material.

With regard to fumed silicon dioxide, partial silylation here means that the amount of non-silylated surface silanol groups on the silicon dioxide surface preferably ranges between not more than 95% and not less than 5%, more preferably from 95% to 50%, and most preferably 90% to 70%, of the starting silicon dioxide.

This means that the density of the surface silanol groups SiOH preferably ranges between a minimum of 0.1 and a maximum of 1.7, more preferably from 0.9 to 1.7, and most preferably from 1.25 to 1.6, SiOH per nm$^2$ of particle surface area.

For a starting silicon dioxide with a specific surface area of 200 m$^2$/g that can be employed for the silylation, this means preferably between a minimum of 0.03 mmol/g SiOH and a maximum of 0.57 mmol/g SiOH, more preferably 0.3 to 0.57 mmol/g SiOH, and most preferably 0.42 to 0.54 mmol/g SiOH; for a silicon dioxide having a smaller or greater surface area, this means linearly proportionally more or fewer surface silanol groups SiOH.

Processes for the partial hydrophobizing and partial silylation of particulate solids are already known, as described in EP-B 1 433 749, for example.

The starting silica preferably has a specific BET surface area of 25 to 500 m$^2$/g. The starting silica preferably comprises aggregates (defined according to DIN 53206) in the 100 to 1000 nm diameter range, with the silica having agglomerates (defined according to DIN 53206) that are composed of aggregates and that have sizes of 1 to 500 μm in dependence on the external shearing load (e.g., measurement conditions).

The starting silica preferably has a fractal surface dimension of preferably less than or equal to 2.3, the fractal surface dimension $D_S$ here being defined as follows: particle surface area A is proportional to particle radius R to the power of $D_S$. The starting silica preferably has a density of accessible surface silanol groups SiOH—that is, of surface silanol groups SiOH that are accessible to a chemical reaction—of preferably 1.5 to 2.5 SiOH per nm$^2$ of specific surface area, more preferably 1.6 to 2.0 SiOH per nm$^2$.

As starting silicas for preparing the component (B) used in accordance with the invention it is possible to use silicas prepared at high temperature (greater than 1000° C.), with pyrogenically prepared silicas being particularly preferred. Hydrophilic silicas can be used which come freshly prepared directly from the burner, have undergone temporary storage, or have already been packaged in customary commercial form.

As starting silicas it is possible to use uncompacted silicas having tamped or tapped densities of less than 60 g/l, or else compacted silicas having tamped or tapped densities of greater than 60 g/l.

As starting silicas it is possible to use mixtures of different silicas, such as, for example, mixtures of silicas with different BET surface areas.

For the silylation of the silicon dioxide particles it is possible to use all organosilicon compounds known to date and also methods, as described in EP-B 1 433 749 on page 3, line 29 to page 6, line 6, for example.

The silicas used as component (B) in accordance with the invention preferably have a BET surface area of 170 to 250 m$^2$/g and a carbon content of 0.1 to 3 weight percent, preferably 0.1 to 1.5 weight percent, more preferably 0.1 to 1 weight percent, and most preferably 0.1 to 0.7 weight percent, in each case determinable preferably by elemental analysis.

The dispersions of the invention preferably comprise component (B) in amounts of 0.1 to 50 parts by weight, more preferably 1 to 25 parts by weight, and most preferably 2 to 12 parts by weight, based on 100 parts by weight of dispersion.

Examples of component (C) are natural waters, such as rain water, ground water, spring water, river water, and seawater, chemical waters, such as fully demineralized water, distilled or (multiply) redistilled water, waters for medical or pharmaceutical use, such as purified water (aqua purificata; Pharm. Eur. 3) aqua deionisata, aqua destillata, aqua bidestillata, aqua ad injectionam, or aqua conservata, drinking water according to German potable-water law, and mineral waters.

Preferably used as component (C) are chemical waters, more preferably fully demineralized water and distilled water.

The dispersions of the invention preferably comprise water (C) in amounts of 10 to 90 parts by weight, more preferably 20 to 80 parts by weight, and most preferably 30 to 60 parts by weight, based on 100 parts by weight of dispersion.

The organosilicon compounds (D) used in accordance with the invention may be silanes, i.e. compounds of the formula (II) with c+d+e=4, and siloxanes, i.e. compounds comprising units of the formula (II) with c+d+e≤3.

The organosilicon compounds (D) preferably comprise silanes and siloxanes which consist of units of the formula (II), more preferably silanes of the formula (II) and/or their partial hydrolyzates, the partial hydrolyzates preferably having not more than 10 silicon atoms.

Examples of radicals R$^2$ are the radicals specified for R.

Radical R$^2$ preferably comprises alkyl radicals having 1 to 6 carbon atoms, more preferably the methyl radical or the ethyl radical.

Examples of radicals $R^3$ are hydrogen and also the radicals specified for R. Radical $R^3$ preferably comprises hydrogen and hydrocarbon radicals having 1 to 20 carbon atoms, and more particularly, hydrogen.

A preferably comprises radicals of the formula $R^4R^5N$—, where $R^4$ and $R^5$ each independently of one another denote hydrogen or monovalent, optionally substituted hydrocarbon radicals, and the moiety $R^4R^5N$— may also be joined to form a ring.

Examples of radicals $R^4$ and $R^5$ are, in each case independently of one another, hydrogen and the examples specified above for R.

Radical $R^4$ preferably comprises hydrocarbons having 1 to 8 carbon atoms.

Radical $R^5$ preferably comprises hydrogen or hydrocarbons having 1 to 8 carbon atoms.

Examples of radicals A are the dimethylamino, diethylamino, dipropylamino, dibutylamino, dipentylamino, dihexylamino, n-hexylamino, octylamino, N-cyclohexylamino, N-phenylamino, N-morpholino, N-pyrrolidino, and N-piperidino radicals.

Examples of radicals Y are all hydrolyzable radicals known to date, for example, halogen atoms, organyloxy radicals, Si—N-bonded amine radicals, amide radicals, oxime radicals, acyloxy radicals, and aminooxy radicals.

Radical Y preferably comprises organyloxy radicals such as the methoxy, ethoxy, n-propoxy, isopropoxy, n-butoxy, isobutoxy, s-butoxy, tert-butoxy, and 2-methoxyethoxy radicals.

Examples of the organosilicon compounds (D) used in accordance with the invention are $H_2N$—$CH_2$—$Si(OCH_3)_3$, $H_2N$—$CH_2$—$Si(OCH_2CH_3)_3$, $(CH_3$—$(CH_2)_3)_2N$—$CH_2$—$Si(OCH_2CH_3)_3$, $(H_3C)_2N$—$CH_2$—$Si(OCH_2CH_3)_3$, $(H_3C)_2N$—$CH_2$—$Si(OCH_3)_3$, $(H_3C$—$CH_2)_2N$—$CH_2$—$Si(OCH_2CH_3)_3$, $(CH_3$—$(CH_2)_3)_2N$—$CH_2$—$Si(OCH_3)_3$, $(H_3C$—$CH_2)_2N$—$CH_2$—$Si(OCH_3)_3$, $(CH_3$—$(CH_2)_2N$—$CH_2$—$Si(OCH_2CH_3)_3$, $(CH_3$—$(CH_2)_2N$—$CH_2$—$Si(OCH_3)_3$, $((CH_3)_2CH)_2N$—$CH_2$—$Si(OCH_2CH_3)_3$, $((CH_3)_2CH)_2N$—$CH_2$—$Si(OCH_3)_3$, $(CH_3CH_2(CH_3)CH)_2N$—$CH_2$—$Si(OCH_2CH_3)_3$, $(CH_3CH_2(CH_3)CH)_2N$—$CH_2$—$Si(OCH_3)_3$, $((CH_3)_3C)_2N$—$CH_2$—$Si(OCH_2CH_3)_3$, $((CH_3)_3C)_2N$—$CH_2$—$Si(OCH_3)_3$, $(CH_3$—$(CH_2)_4)_2N$—$CH_2$—$Si(OCH_3)_3$, $(CH_3$—$(CH_2)_4)_2N$—$CH_2$—$Si(OCH_2CH_3)_3$, $(CH_3CH_2(CH_3)_2C)_2N$—$CH_2$—$Si(OCH_2CH_3)_3$, $(CH_3CH_2(CH_3)_2C)_2N$—$CH_2$—$Si(OCH_3)_3$, $(CH_3$—$(CH_2)_5)_2N$—$CH_2$—$Si(OCH_2CH_3)_3$, $(CH_3$—$(CH_2)_5)_2N$—$CH_2$—$Si(OCH_3)_3$, $(CH_3$—$(CH_2)_3(CH_3)CH)_2N$—$CH_2$—$Si(OCH_3)_3$, $(CH_3$—$(CH_2)_3(CH_3)CH)_2N$—$CH_2$—$Si(OCH_2CH_3)_3$, $C_6H_5(CH_3)N$—$CH_2$—$Si(OCH_2CH_3)_3$, $C_6H_5$ $(CH_3)N$—$CH_2$—$Si(OCH_3)_3$, $C_6H_{11}(CH_3)N$—$CH_2$—$Si(OCH_2CH_3)_3$, $C_6H_{11}(CH_3)N$—$CH_2$—$Si(OCH_3)_3$, $(C_6H_{11})_2N$—$CH_2$—$Si(OCH_2CH_3)_3$, $(C_6H_{11})_2N$—$CH_2$—$Si(OCH_3)_3$, $(CH_3$—$(CH_2)_3)HN$—$CH_2$—$Si(OCH_2CH_3)_3$, $(H_3C)HN$—$CH_2$—$Si(OCH_2CH_3)_3$, $(H_3C)HN$—$CH_2$—$Si(OCH_3)_3$, $(H_3C$—$CH_2)HN$—$CH_2$—$Si(OCH_2CH_3)_3$, $(CH_3$—$(CH_2)_2)HN$—$CH_2$—$Si(OCH_3)_3$, $(CH_3$—$(CH_2)_2HN$—$CH_2$—$Si(OCH_2CH_3)_3$, $(CH_3$—$(CH_2)_3)HN$—$CH_2$—$Si(OCH_3)_3$, $(H_3C$—$CH_2)HN$—$CH_2$—$Si(OCH_3)_3$, $((CH_3)_2CH)HN$—$CH_2$—$Si(OCH_2CH_3)_3$, $((CH_3)_2CH)HN$—$CH_2$—$Si(OCH_3)_3$, $((CH_3)_3C)HN$—$CH_2$—$Si(OCH_2CH_3)_3$, $((CH_3)_3C)HN$—$CH_2$—$Si(OCH_3)_3$, $(CH_3CH_2(CH_3)CH)HN$—$CH_2$—$Si(OCH_2CH_3)_3$, $(CH_3CH_2(CH_3)CH)HN$—$CH_2$—$Si(OCH_3)_3$, $(CH_3$—$(CH_2)_4)HN$—$CH_2$—$Si(OCH_3)_3$, $(CH_3$—$(CH_2)_4)HN$—$CH_2$—$Si(OCH_2CH_3)_3$, $(CH_3CH_2(CH_3)_2C)HN$—$CH_2$—$Si(OCH_2CH_3)_3$, $(CH_3CH_2(CH_3)_2C)HN$—$CH_2$—$Si(OCH_3)_3$, $(CH_3$—$(CH_2)_5)HN$—$CH_2$—$Si(OCH_2CH_3)_3$, $(CH_3$—$(CH_2)_5)HN$—$CH_2$—$Si(OCH_3)_3$, $(CH_3$—$(CH_2)_3(CH_3)CH)HN$—$CH_2$—$Si(OCH_3)_3$, $(CH_3$—$(CH_2)_3(CH_3)CH)HN$—$CH_2$—$Si(OCH_2CH_3)_3$, $(CH_3$—$(CH_2)_5)HN$—$CH_2$—$Si(OCH_3)_3$, $(CH_3$—$(CH_2)_3(CH_3)CH)HN$—$CH_2$—$Si(OCH_3)_3$, $(CH_3$—$(CH_2)_3(CH_3)CH)HN$—$CH_2$—$Si(OCH_2CH_3)_3$, $C_6H_5HN$—$CH_2$—$Si(OCH_2CH_3)_3$, $C_6H_5HN$—$CH_2$—$Si(OCH_3)_3$, $C_6H_5HN$—$CH_2$—$Si(OCH_2CH_3)_3$, $C_6H_{11}HN$—$CH_2$—$Si(OCH_2CH_3)_3$, $C_6H_{11}HN$—$CH_2$—$Si(OCH_3)_3$, cyclo(O($CH_2$—$CH_2)_2N$)—$CH_2$—$Si(OCH_2CH_3)_3$, Cyclo(O($CH_2$—$CH_2)_2N$)—$CH_2$—$Si(OCH_3)_3$, Cyclo(HN($CH_2$—$CH_2)_2N$)—$CH_2$—$Si(OCH_2CH_3)_3$, Cyclo(HN($CH_2$—$CH_2)_2N$)—$CH_2$—$Si(OCH_3)_3$, $H_2N$—$CH_2SiCH_3(OCH_3)_2$, $H_2N$—$CH_2$—$SiCH_3(OCH_2CH_3)_2$, $(H_3C)_2N$—$CH_2$—$SiCH_3(OCH_2CH_3)_2$, $(H_3C)_2N$—$CH_2$—$SiCH_3(OCH_3)_2$, $(CH_3$—$(CH_2)_3)_2N$—$CH_2$—$SiCH_3(OCH_2CH_3)_2$, $(H_3C$—$CH_2)_2N$—$CH_2$—$SiCH_3(OCH_2CH_3)_2$, $(CH_3$—$(CH_2)_3)_2N$—$CH_2$—$SiCH_3(OCH_3)_2$, $(H_3C$—$CH_2)_2N$—$CH_2SiCH_3(OCH_3)_2$, $(CH_3$—$(CH_2)_2)_2N$—$CH_2$—$SiCH_3(OCH_3)_2$, $(CH_3$—$(CH_2)_2)_2N$—$CH_2$—$SiCH_3(OCH_2CH_3)_2$, $((CH_3)_2CH)_2N$—$CH_2$—$SiCH_3(OCH_2CH_3)_2$, $((CH_3)_2CH)_2N$—$CH_2$—$SiCH_3(OCH_3)_2$, $((CH_3)_3C)_2N$—$CH_2$—$SiCH_3(OCH_2CH_3)_2$, $((CH_3)_3C)_2N$—$CH_2$—$SiCH_3(OCH_3)_2$, $(CH_3CH_2(CH_3)CH)_2N$—$CH_2$—$SiCH_3(OCH_2CH_3)_2$, $(CH_3$—$(CH_2)_4)_2N$—$CH_2$—$SiCH_3(OCH_3)_2$, $(CH_3$—$(CH_2)_4)_2N$—$CH_2$—$SiCH_3(OCH_2CH_3)_2$, $(CH_3$—$(CH_2)_3(CH_3)CH)_2N$—$CH_2$—$SiCH_3(OCH_3)_2$, $(CH_3$—$(CH_2)_3(CH_3)CH)_2N$—$CH_2$—$SiCH_3(OCH_2CH_3)_2$, $(CH_3CH_2(CH_3)CH)_2N$—$CH_2SiCH_3(OCH_3)_2$, $(CH_3CH_2(CH_3)_2C)_2N$—$CH_2$—$SiCH_3(OCH_2CH_3)_2$, $(CH_3CH_2(CH_3)_2C)_2N$—$CH_2$—$SiCH_3(OCH_3)_2$, $(CH_3$—$(CH_2)_5)_2N$—$CH_2SiCH_3(OCH_2CH_3)_2$, $(CH_3$—$(CH_2)_5)_2N$—$CH_2$—$SiCH_3(OCH_3)_2$, $C_6H_5(CH_3)N$—$CH_2$—$SiCH_3(OCH_2CH_3)_2$, $C_6H_5(CH_3)N$—$CH_2$—$SiCH_3(OCH_3)_2$, $C_6H_{11}(CH_3)N$—$CH_2$—$SiCH_3(OCH_2CH_3)_2$, $C_6H_{11}(CH_3)N$—$CH_2$—$SiCH_3(OCH_3)_2$, $(CH_3$—$(CH_2)_3)HN$—$CH_2$—$SiCH_3(OCH_2CH_3)_2$, $(H_3C$—$CH_2)HN$—$CH_2$—$SiCH_3(OCH_2CH_3)_2$, $(H_3C)HN$—$CH_2$—$SiCH_3(OCH_2CH_3)_2$, $(H_3C)HN$—$CH_2$—$SiCH_3(OCH_3)_2$, $(CH_3$—$(CH_2)_3HN$—$CH_2$—$SiCH_3(OCH_3)_2$, $(H_3C$—$CH_2)HN$—$CH_2$—$SiCH_3(OCH_3)_2$, $(CH_3$—$(CH_2)_2)HN$—$CH_2$—$SiCH_3(OCH_2CH_3)_2$, $(CH_3$—$(CH_2)_2)HN$—$CH_2$—$SiCH_3(OCH_3)_2$, $((CH_3)_2CH)HN$—$CH_2SiCH_3(OCH_2CH_3)_2$, $((CH_3)_2CH)HN$—$CH_2$—$SiCH_3(OCH_3)_2$, $((CH_3)_3C)HN$—$CH_2$—$SiCH_3(OCH_2CH_3)_2$, $((CH_3)_3C)HN$—$CH_2$—$SiCH_3(OCH_3)_2$, $(CH_3CH_2(CH_3)CH)HN$—$CH_2$—$SiCH_3(OCH_2CH_3)_2$, $(CH_3CH_2(CH_3)CH)HN$—$CH_2$—$SiCH_3(OCH_3)_2$, $(CH_3$—$(CH_2)_4)HN$—$CH_2$—$SiCH_3(OCH_3)_2$, $(CH_3$—$(CH_2)_4)HN$—$CH_2$—$SiCH_3(OCH_2CH_3)_2$, $(CH_3CH_2(CH_3)_2C)HN$—$CH_2$—$SiCH_3(OCH_2CH_3)_2$, $(CH_3CH_2(CH_3)_2C)HN$—$CH_2$—$SiCH_3(OCH_3)_2$, $(CH_3$—$(CH_2)_5)HN$—$CH_2$—$SiCH_3(OCH_2CH_3)_2$, $(CH_3$—$(CH_2)_5)HN$—$CH_2$—$SiCH_3(OCH_3)_2$, $(CH_3$—$(CH_2)_3(CH_3)CH)HN$—$CH_2$—$SiCH_3(OCH_3)_2$, $(CH_3$—$(CH_2)_3(CH_3)CH)HN$—$CH_2$—$SiCH_3(OCH_2CH_3)_2$, $C_6H_5HN$—$CH_2$—$SiCH_3(OCH_2CH_3)_2$, $C_6H_5HN$—$CH_2$—$SiCH_3(OCH_3)_2$, $(C_6H_{11})HN$—$CH_2$—$SiCH_3(OCH_2CH_3)_2$, $(C_6H_{11})HN$—$CH_2$—$SiCH_3(OCH_3)_2$, and also their partial hydrolyzates.

The organosilicon compound (D) used in accordance with the invention preferably comprises $(H_3C)_2N$—$CH_2$—$Si(OCH_3)_3$, $(H_3C)_2N$—$CH_2$—$Si(OCH_2CH_3)_3$, $(H_3C$—$CH_2)_2N$—$CH_2$—$Si(OCH_3)_3$, $(H_3C$—$CH_2)_2N$—$CH_2$—$Si(OCH_2CH_3)_3$, $((CH_3)_2CH)_2N$—$CH_2$—$Si(OCH_2CH_3)_3$, $((CH_3)_2CH)_2N$—$CH_2$—$Si(OCH_3)_3$, $(CH_3$—$(CH_2)_2)_2N$—$CH_2$—$Si(OCH_2CH_3)_3$, $(CH_3$—$(CH_2)_2)_2N$—$CH_2$—$Si(OCH_3)_3$, $(CH_3$—$(CH_2)_3)_2N$—$CH_2$—$Si(OCH_2CH_3)_3$, $(CH_3$—$(CH_2)_3)_2N$—$CH_2$—$Si(OCH_3)_3$, $(CH_3CH_2(CH_3)CH)_2N$—$CH_2$—$Si(OCH_2CH_3)_3$, $(CH_3CH_2(CH_3)CH)_2N$—$CH_2$—$Si(OCH_3)_3$, $((CH_3)_3C)_2N$—$CH_2$—$Si(OCH_2CH_3)_3$, $((CH_3)_3C)_2N$—$CH_2$—$Si(OCH_3)_3$, $(CH_3$—$(CH_2)_4)_2N$—$CH_2$—$Si(OCH_3)_3$, $(CH_3$—$(CH_2)_4)_2N$—$CH_2$—$Si(OCH_2CH_3)_3$, $(CH_3CH_2(CH_3)_2C)_2N$—$CH_2$—$Si(OCH_2CH_3)_3$, $(CH_3CH_2(CH_3)_2C)_2N$—$CH_2$—$Si(OCH_3)_3$, $(CH_3(CH_2)_3(CH_3)CH)_2N$—$CH_2Si(OCH_3)_3(CH_3$—$(CH_2)_3$ $(CH_3)CH)_2N-CH_2-Si(OCH_2CH_3)_3$, $(CH_3-(CH_2)_5)_2N-CH_2-Si(OCH_3)_3$, $(CH_3-(CH_2)_5)_2N-CH_2-Si(OCH_2CH_3)_3$, $(C_6H_{11})_2N-CH_2-Si(OCH_2CH_3)_3$, $(C_6H_{11})_2N-CH_2-Si(OCH_3)_3$, $(C_6H_{11})HN-CH_2-Si(OCH_2CH_3)_3$, $(C_6H_{11})HN-CH_2-Si(OCH_3)_3$, cyclo(O(CH_2-CH_2)_2N)-CH_2-Si(OCH_2CH_3)_3$, cyclo(O(CH_2-CH_2)_2N)-CH_2-Si(OCH_3)_3$, cyclo(HN(CH_2-CH_2)_2N)-CH_2-Si(OCH_2CH_3)_3$ and cyclo(HN(CH_2-CH_2)_2N)-CH_2-Si(OCH_3)_3$, and also their partial hydrolyzates; particular preference is given to $(H_3C)_2N-CH_2-Si(OCH_3)_3$, $(H_3C)_2N-CH_2-Si(OCH_2CH_3)_3$, $(H_3C-CH_2)_2N-CH_2-Si(OCH_2CH_3)_3$, $(H_3C-CH_2)_2N-CH_2-Si(OCH_3)_3(CH_3-(CH_2)_2)_2N-CH_2-Si(OCH_2CH_3)_3$, $(CH_3-(CH_2)_2)_2N-CH_2-Si(OCH_3)_3$, $((CH_3)_2CH)_2N-CH_2Si(OCH_2CH_3)_3$, $((CH_3)_2CH)_2N-CH_2Si(OCH_3)_3$, $(CH_3-(CH_2)_3)_2N-CH_2-Si(OCH_2CH_3)_3$, $(CH_3-(CH_2)_3)_2N-CH_2-Si(OCH_3)_3$, $(CH_3CH_2(CH_3)CH)_2N-CH_2-Si(OCH_2CH_3)_3$, $(CH_3CH_2(CH_3)CH)_2N-CH_2-Si(OCH_3)_3$, $((CH_3)_3C)_2N-CH_2-Si(OCH_2CH_3)_3$, $((CH_3)_3C)_2N-CH_2-Si(OCH_3)_3$, $(CH_3-(CH_2)_4)_2N-CH_2-Si(OCH_3)_3$, $(CH_3-(CH_2)_4)_2N-CH_2-Si(OCH_2CH_3)_3$, $(CH_3CH_2(CH_3)_2C)_2N-CH_2-Si(OCH_2CH_3)_3$, $(CH_3CH_2(CH_3)_2C)_2N-CH_2-Si(OCH_3)_3$, $(CH_3-(CH_2)_5)_2N-CH_2-Si(OCH_3)_3$, $(CH_3-(CH_2)_5)_2N-CH_2-Si(OCH_2CH_3)_3$, $(C_6H_{11})_2N-CH_2-Si(OCH_2CH_3)_3$, and $(C_6H_{11})_2N-CH_2-Si(OCH_3)_3$ and also their partial hydrolyzates.

The organosilicon compounds (D) are commercially customary products and/or can be prepared by methods common in silicon chemistry.

For preparing the aqueous, crosslinkable dispersions of the invention, component (D) is preferably present in amounts of 0.01 to 10 parts by weight, more preferably 0.05 to 5 parts by weight, more preferably 0.1 to 3 parts by weight, based on 100 parts by weight of dispersion.

The further substances (E) optionally employed are any desired substances which are useful in aqueous, crosslinkable dispersions, for example, fillers other than (B), crosslinking catalysts, adhesion promoters, plasticizers, organic solvents inert relative to the dispersions, pH modifiers, and additives.

Examples of fillers (E) optionally employed in accordance with the invention are nonreinforcing fillers such as fillers having a BET surface area of up to 50 m$^2$/g, such as quartz, diatomaceous earth, calcium silicate, zirconium silicate, zeolites, aluminum oxide, titanium oxide, iron oxide, zinc oxide, magnesium hydroxide, aluminum hydroxide, barium sulfate, calcium carbonate, gypsum, silicon nitride, silicon carbide, boron nitride, glass powders, and polymeric powders, and also reinforcing fillers, these being fillers having a BET surface area of more than 50 m$^2$/g, such as pyrogenically prepared silica, precipitated silica, precipitated chalk, carbon blacks such as furnace black and acetylene black, and mixed silicon-aluminum oxides of high BET surface area, fibrous fillers such as asbestos, and also polymeric fibers.

The fillers (E) may have been hydrophobized, for example by treatment with organosilanes and/or organosiloxanes or with steric acid, or by etherification of hydroxyl groups to alkoxy groups.

The optionally employed fillers (E) are preferably fumed silicas, carbon blacks, aluminum hydroxides, magnesium hydroxides, coated or uncoated calcium carbonates, or silicatic fillers.

If fillers (E) are used, the amounts involved are preferably 0.1 to 200 parts by weight, more preferably 0.5 to 100 parts by weight, based in each case on 100 parts by weight of organosilicon compound (A). The amount of filler (E) used may be varied within wide ranges and is guided in particular by the respective end use of the dispersions of the invention. The dispersions of the invention preferably are prepared using filler (E).

As crosslinking catalysts (E) it is possible to use all known compounds that accelerate the formation of siloxane bonds. Examples of such catalysts (E) are organotin compounds such as dibutyltin dilaurate, dibutyltin diacetate, dibutyltin oxide, dioctyltin dilaurate, dioctyltin diacetate, dioctyltin oxide, and also the reaction products thereof with alkoxysilanes such as tetraethoxysilane, for example. Further examples of catalysts (E) are titanium compounds such as tetraisopropyl titanate, tetrabutyl titanate, and titanium chelates, and also the corresponding zirconium or hafnium compounds and metal carboxylates, preference being given to dibutyl- and dioctylorganotin carboxylates and also to carboxylates of bismuth, lithium, strontium, zinc, and bismuth, with particular preference being given to dibutyl- and dioctylorganotin carboxylates.

If crosslinking catalysts (E) are used, the amounts involved are preferably 0.01 to 10 parts by weight, more preferably 0.02 to 5 parts by weight, based in each case on 100 parts by weight of organosilicon compound (A). The dispersions of the invention are preferably prepared without using any crosslinking catalysts (E).

As adhesion promoters (E) it is possible to use all compounds which are useful in crosslinkable siloxane materials, these promoters preferably being different from the components (A) and (D). Examples of adhesion promoters (E), which are added for the purpose of enhancing the adhesion of the elastomeric products obtained from the aqueous dispersions of the invention following removal of their solvent fractions, to the substrate to which the dispersions of the invention have been applied, are amino-functional silanes such as aminopropyltrialkoxysilanes, N-(2-aminoethyl)-3-amino-propyltrialkoxysilanes, acryloyl- or methacryloyl-functional alkoxysilanes such as acryloyloxypropyl- or methacryloyloxypropyltrialkoxysilanes, and also epoxy-functional alkoxysilanes such as glycidyloxypropyltrialkoxysilanes, in which the alkoxy radical is a methoxy, ethoxy, n-propoxy, or isopropoxy radical, and also the hydrolysis products thereof.

The optionally employed adhesion promoter (E) preferably comprises aminopropyltrialkoxysilane, N-(2-aminoethyl)-3-aminopropyltrialkoxysilane, acryloyl-oxypropyl- or methacryloyloxypropyltrialkoxysilane, glycidyloxypropyltrialkoxysilanes in which the alkoxy radical is preferably a methoxy or ethoxy radical, and also the hydrolysis products thereof.

If adhesion promoter (E) is used, the amounts involved are preferably 0.01 to 20 parts by weight, more preferably 0.1 to 5 parts by weight, based in each case on 100 parts by weight of organosilicon compound (A). The dispersions of the invention are preferably prepared using adhesion promoter (E).

As plasticizers (E) it is possible to use all compounds which are useful in crosslinkable siloxane materials, these plasticizers preferably being different from components (A) and (D). Examples of optionally employed plasticizers (E) are dimethylpolysiloxanes which are liquid at room temperature, are endblocked by trimethylsiloxy groups, and have a viscosity of at least 10 mPas at 25° C., with preference being given to trimethylsilyl-stopped polydimethylsiloxanes or partially phenylated, trimethylsilyl-stopped polydimethylsiloxanes having a viscosity in the range from 20 to 5000 mPas at 25° C.

If plasticizers (E) are used, the amounts involved are preferably 1 to 50 parts by weight, more preferably 1 to 20 parts by weight, based in each case on 100 parts by weight of organosilicon compound (A).

Examples of organic solvents (E) which are inert in respect of the dispersions and which may optionally be employed are hydrocarbons such as petroleum ethers of various boiling ranges, n-pentane, n-hexane, hexane isomer mixtures, toluene, and xylene.

If organic solvents (E) are used, the amounts involved are preferably 1 to 50 parts by weight, more preferably 5 to 20 parts by weight, based in each case on 100 parts by weight of organosilicon compound (A). The dispersions of the invention are preferably prepared without using any organic solvents (E).

Examples of pH modifiers (E) are acids and bases and also buffer systems, such as, for example, phosphoric acid, hydrochloric acid, carboxylic acids, alkali metal hydroxide or alkaline earth metal hydroxide solutions, amines, and also the resultant buffer systems.

As additives (E) it is possible to use all substances which are useful in crosslinkable siloxane materials, these additives preferably being different from components (A), (B), and (D). Examples of additives (E) are soluble dyes, organic and inorganic pigments, fungicides and microbiocides, fragrances, rheological assistants, corrosion inhibitors, oxidation inhibitors, light stabilizers, heat stabilizers, flame retardants, and agents for influencing the electrical properties, with preference being given to organic and inorganic pigments, fungicides, rheological assistants, light stabilizers, heat stabilizers, flame retardants, and agents for influencing the electrical properties, and with particular preference being given to organic and inorganic pigments, rheological assistants, light stabilizers, and heat stabilizers. More particularly the optionally employed additives comprise organic and inorganic pigments, light stabilizers, heat stabilizers, flame retardants, and agents for influencing the electrical properties.

If additives (E) are employed, the amounts involved are preferably 0.01 to 20 parts by weight, more preferably 0.1 to 10 parts by weight, based in each case on 100 parts by weight of organosilicon compound (A). The dispersions of the invention are preferably prepared using additives (E).

The components employed in accordance with the invention may in each case comprise one individual kind or else a mixture of at least two kinds of such components.

The aqueous dispersions of the invention may attain solids contents of up to 95 weight percent. Lower solids contents are of course possible. Even in the case of aqueous silicone dispersions of the invention which comprise no further fillers (E), a solids content of more than 90 wt % can be achieved. The solids content here means the weight fraction of all constituents of the dispersion apart from water and, if used, organic solvent, based on the total weight of the dispersion.

The dispersions of the invention preferably have a solids content of 10 to 80 wt %, more preferably 20 to 70 wt %, and most preferably 30 to 60 wt %.

The aqueous dispersions of organopolysiloxanes according to the invention preferably pH values of 3 to 13, more preferably 3 to 11, yet more preferably 4 to 10, and most preferably 5 to 9.

The aqueous dispersions of organopolysiloxanes according to the invention may be firm or fluid, according to application.

The dispersions of the invention are preferably dispersions prepared using components (A), (B), (C), (D), and also optionally (E), with other components preferably not being used.

The aqueous dispersions of the invention may be prepared in principle by any desired processes known to date, such as by simple mixing of the components employed, for example.

The invention further provides a process for preparing the aqueous, crosslinkable dispersions of the invention by mixing the components employed.

According to one preferred process variant, constituents (A) and optionally (E) are mixed with one another and then dispersed together with components (B) and (C), and crosslinkers (D) are added subsequently.

One particularly preferred process variant is characterized in that the constituents (A) and optionally (E) are mixed with one another and then dispersed together with components (B) and (C), with component (B) being predispersed in a portion of the water (C), to give, for example, a 20% dispersion of silica in water, in order to reduce the release of dust in the course of handling, and subsequently crosslinker (D) is added.

Dispersing may take place in customary mixing equipment suitable for preparing emulsions and dispersions and providing a sufficiently high input of shearing energy, such as, for example, high-speed stator-rotor stirrers, such as those according to Prof. P. Willems, for example, known under the brand name Ultra-Turrax®, or other stator-rotor systems, known under the brand names Kady, Unimix, Koruma, Cavitron, Sonotron, Netzsch, IKA, or Ystral. Other possible techniques are ultrasound techniques such as US probes/transducers or US flow cells or US systems such as or analogous to those available from Sonorex/Bandelin, or ball mills, such as Dyno-Mill from WAB, CH, for example. Further possible techniques are carried out using high-speed stirrers, such as paddle stirrers or straight-arm stirrers, dissolvers such as disk dissolvers, from Getzmann, for example, or mixing systems such as planetary dissolvers, straight-arm dissolvers, or other combined assemblies comprising dissolver systems and stirrer systems. Other suitable systems are extruders or compounders.

The process of the invention may be carried out discontinuously or continuously.

The dispersion of the invention may of course also be prepared in a different way. It has emerged, however, that the mode of procedure is critical and that, for example, not all modes of preparation result in dispersions which following removal of water lead to elastomers.

The process of the invention has the advantage that it is very simple and economical to implement and that aqueous dispersions having variable solids contents can be prepared.

The aqueous dispersions of the invention can be employed for all purposes for which aqueous dispersions are useful, for example as sealants and adhesives, inks, and paint systems, and as coating systems which are electrically insulating or conducting, hydrophobic, and/or repellant to sticky substances, or as a basis for or additions to such systems.

The aqueous dispersions of the invention cure even at room temperature within a short time after evaporation of the volatile fractions, i.e. of the water and, optionally, of the organic solvent, to form elastomers or resins.

The present invention additionally provides shaped articles produced by crosslinking the dispersions of the invention.

The aqueous dispersions of the invention have the advantage that they can be prepared in a simple way.

The aqueous dispersions of the invention further have the advantage that they exhibit a long shelf life.

The aqueous dispersions of the invention additionally have the advantage that there is no need at all for organic emulsifiers, and hence it is possible to achieve great improvements in factors including the water resistance of the contact areas between the resultant shaped articles and the substrates.

The aqueous dispersions of the invention have the advantage that, in contrast to existing systems, their rheology can be formulated in ranges of the kind known for nonaqueous systems.

The aqueous dispersions of the invention have the advantage, furthermore, that the mechanical properties of the cured products are within ranges of the kind known for nonaqueous systems.

The aqueous dispersions of the invention have the advantage, moreover, that they can be formulated in such a way that no volatile organic compounds at all are emitted to the atmosphere in the course of curing.

The aqueous dispersions of the invention have the advantage, moreover, that they form firmly adhering coatings on numerous substrates, such as, for example, paper, textiles, mineral building materials, plastics, wood, and many other substrates. This coating may take place for example by brushing, rolling, dipping, or spraying.

One preferred field of the use is that as sealants, adhesives, and coating materials. Examples of coatings include exterior architectural coatings and impregnating systems, elastic masonry paints, coatings on textiles and woven fabrics, and also various coating applications for the attainment of durable water repellency.

In the examples described below, all data for parts and percentages, unless otherwise specified, are given by weight. Furthermore, all viscosity data are based on a temperature of 25° C. Unless indicated otherwise, the examples below are carried out under the pressure of the surrounding atmosphere, i.e. at between 900 and 1100 hPa, and at room temperature, i.e. at about 22° C., or at a temperature which comes about when the reactants are combined at room temperature without additional heating or cooling.

The elastomer properties are each determined in accordance with the following standardized tests:
Tensile strength DIN 53504 S2
Elongation at break DIN 53504 S2
Modulus DIN 53504 S2
Shore A hardness DIN 53505
Preparation of Particulate Solids B1

100 g of a fumed silica having a specific BET surface area, measured to DIN 66131 and DIN 66132, of 200 m$^2$/g (available from Wacker Chemie AG, D-Munich under the name HDK® N20) are fluidized with stirring (at 1000 rpm with a stirrer paddle diameter of 12.5 cm), then subjected for 15 minutes to nitrogen gas and rendered inert, after which the stream of nitrogen is shut off again. Then 2 g of dimethyldichlorosilane in aerosol form are sprayed on into the fluidized silica using a two-fluid nozzle, at a temperature of about 25° C. and an ambient pressure of about 1013 hPa. After 30 minutes of further stirring, the silica thus treated is then heat-treated at 300° C. for 2 hours in an oven with a capacity of 100 l under a gentle stream of nitrogen of 1000 l/h. This gives a white pulverulent silica having the following properties:

the silica is somewhat water-wettable but not completely; this is evident in the fact that only 12 wt % of the silica can be incorporated into water using an Ultraturrax to form a fluid mass which is stable for one day, whereas under the same conditions and at the same viscosity 24 wt % of the starting silica (HDK® N20), which is completely water-wettable, can be so incorporated.

Further properties of the silica are summarized in Table 1.

TABLE 1

| Property | Silica B1 according to Example 1 |
| --- | --- |
| BET surface area | 184 m$^2$/g |
| Residual amount of nonsilylated silica silanol groups | 80% |
| Carbon content % C | 0.5 wt % |
| Methanol number | 0 |
| Contact angle THETA Method-1 against water and air | 84° |
| Contact angle THETA Method-2 against water and air | 80° |
| Surface energy GAMMA | 69 mJ/m$^2$ |
| Dispersion component of the surface energy GAMMA-s-D | 65 mJ/$^2$ |

Specific BET surface area, measured in accordance with DIN 66131 and DIN 66132

Residual amount of nonsilylated silica-silanol groups, obtained as the ratio (a) of the amount of silica silanol groups, of the silica prepared as stated above, divided by the amount of the silica silanol groups of the untreated starting silica (HDK® N20); the amount of silica silanol groups is determined by acid-base titration (in analogy to G. W. Sears, Anal. Chem. 28 (12), (1950), 1981). Method: acid-base titration of the silica in suspension in water/methanol=50:50; titration in the region above the pH range of the isoelectric point and below the pH range of dissolution of the silica; untreated silica with 100% SiOH (silica-surface silanol groups): SiOH-phil=1.8 SiOH/nm$^2$; silylated silica: SiOH-silyl; residual amount of nonsilylated silica-silanol groups: % SiOH=SiOH-silyl/SiOH-phil*100%

Carbon content % C determined by means of elemental analysis for carbon; combustion of the sample at more than 1000° C. in a stream of O$_2$, detection and quantification of the resultant CO$_2$ by IR; instrument LECO 244

Methanol number, measured as follows: test (% by volume MeOH in water) of wettability with water-methanol mixtures=methanol number (MN): an equal volume of the silica is shaken in with an equal volume of water/methanol mixture; start with 0% methanol; in the case of nonwetting, silica floats: a mixture with an MeOH content higher by 5% by volume is to be used; in the case of wetting, silica sinks: fraction of MeOH (%) in water gives methanol number (MN)

Contact angle THETA Method-1 against water, measured as follows: the contact angle of the particles is obtained by careful preparation, by customary methods, of a compact of the silica with subsequent determination of the contact angle against water, in this case a drop of double-distilled water lying on the surface, in air, by digital image evaluation.

The contact angle θ defines the ratio of the surface tensions and surface energies γ of liquids (l) and solids (s) in a gas space (g) as follows.

$\cos(\theta) = (\gamma(sl) - \gamma(sg))/\gamma(lg)$

The surface energy (mJ/m$^2$) of a solid is equal in dimension to the surface tension of a liquid (mN/m), since it is the case that [J]=[N*m]. Contact angle THETA Method-2 against water, measured as by means of an imbibition method using the Lucas-Washburn equation, based on the inward suction of known and defined liquid, with known surface tension, into a defined accumulation, such as, in this case, a compact of the silica, with a low level of compaction, with an open porosity of more than 0.25 and pore radius r. The upward suction rate dh/dt, and the height of the liquid column sucked up, h, calculated from the mass uptake m of liquid through the particle accumulation against the time t, and also of the viscosity of the liquid sucked up, η, and the surface tension γ of the liquid sucked up make it possible, given a known particle radius r by means of the Lucas-Washburn equation (Washburn, E. W., Phys. Rev. 17, 273 (1921) and R. Lucas, Kolloid Z. 23, 15 (1918)) to determine the cosine value of θ (cos(θ)) and hence the contact angle θ of the liquid against the particle surface; following J. Schoelkopf et al, J. Colloid. Interf. Sci. 227, 119-131 (2000)

As a liquid of known surface tension use is made of methanol/water mixtures in the following proportions (volume of methanol to volume of water): 0:100, 5:95, 10:90, 15:85, 20:80, 25:75, 30:70, 35:65, 40:60, 45:55, 50:50, 55:45, 60:40, 65:35, 70:30, 75:25, 80:20, 85:15, 90:10, 95:5, 100:0.

$$dh/dt = r^* \gamma^* \cos(\theta)/(4^* \eta)$$

and $$h^2 = r^* \gamma^* t^* \cos(\theta)/(2^* \eta)$$

$t = A \cdot m^2$: Washburn equation where t: time
m: mass of liquid drawn in by suction $$A = \frac{\eta}{\{C \cdot \rho^2 \cdot \gamma \cdot \cos \vartheta\}}$$

η: viscosity of the liquid
ρ: density of the liquid
γ: surface tension of the liquid
σ: liquid/powder contact angle
C: factor dependent only on the geometric properties of the powder and sample tube An illustration of the measurement method can be found in FIG. 1.

FIG. 1

Figure 2:
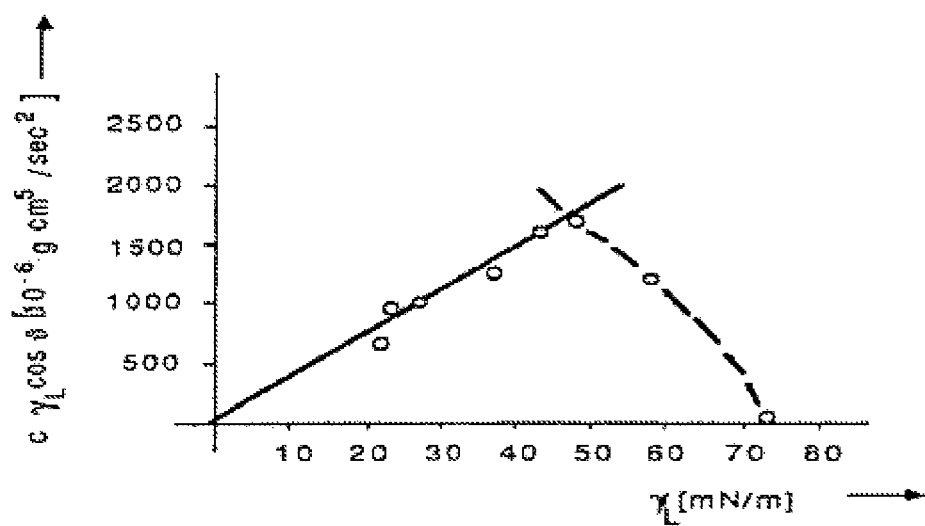

The surface energy GAMMA can be determined for particles in the form of the critical surface energy GAMMA-crit by means of a Zisman plot, which as given in FIG. 2 plots the respective contact angle THETA of the silica against a defined liquid, as determined above by the imbibition method, against the contact angle of the respective liquids

FIG. 2

For particles such as fumed silica which form agglomerates having bulk densities $d_{bd} \ll 1$ g/ml but are composed of primary particles having material densities $d_{md} > 1$ g/ml it is possible to employ a method of shaken incorporation into liquids differing in surface tension: in the case of nonwetting, the particle agglomerates float; in the case of wetting, the air in the agglomerates is displaced and the particle agglomerates sink. Using different liquids differing in surface tension allows a precise determination to be made of the surface tension of a liquid, where the particle agglomerates sink; this provides the critical surface energy $\gamma_{crit}$ as a measure of the surface energy γ of the particles.

The method can also be simplified by lowering the surface tension of water (72.5 mN/m) by adding methanol, ethanol or isopropanol.

Typically it is possible to introduce water, to place a defined amount of particle agglomerates (floating) on the water surface and then to titrate in the alcohol, with stirring. The water-to-alcohol ratio when the particle agglomerates sink is recorded and the surface tension is determined precisely for this water:alcohol ratio in a separate experiment using standard methods (ring detachment method, Wilhelmy method).

More effectively, and as carried out here, defined mixtures of water with methanol are prepared, and then the surface tensions of these mixtures are determined. In a separate experiment these water:methanol mixtures are overlayered with defined amounts of particle agglomerates (for example, in a 1:1 volume ratio) and shaken under defined conditions (for example, gentle shaking by hand or using a tumble mixer for about 1 minute). A determination is made of the water:methanol mixture in which the particle agglomerates still just do not sink and of the water:methanol mixture with a higher methanol content in which the particle agglomerates do just sink. The surface tension of the latter methanol:water mixture gives the critical surface energy $\gamma_{crit}$ as a measure of the surface energy γ of the particles, as provided in Table 1.

The dispersions fraction of the surface energy, gamma-s-D, is determined by inverse gas chromatography with alkanes as probes, in accordance with "Inverse Gas Chromatography"—"Characterization of Polymers and other Materials", 391 ACS Symposium Series, D R Lloyd, Th C Ward, H P Schreiber, Chapter 18, pp 248-261, ACS, Washington D.C. 1989, ISBN 0-8412-1610-X.

Preparation of an Aqueous Particle Dispersion B2

In a 1000 ml stainless steel beaker, 500 g of fully demineralized (FD) water and 200 g of the particulate solids B1 whose preparation was described above are dispersed by means of a high-speed stator-rotor stirring device in accordance with Prof. P. Willems, known under the brand name Ultra-Turrax®. The particulate solids B1 are added in 5 equal portions. After homogenization of the first addition of B1, the pH is adjusted to 9 using (1N) KOH solution. The other portions are added over 2 hours. This gives a flow-resistant white dispersion of 28% solids content for further use in the examples of the invention.

Example 1

70 g of the above-prepared particle dispersion B2 are admixed, with continual mixing by means of a planetary dissolver (PC Labotop), with a mixture of 200 g of an OH-terminated polydimethylsiloxane having a viscosity of 6000 mPas (available commercially under the name "Polymer 6000" from Wacker Chemie AG, D-Munich) and with 6 g of a hydrophobized silica (available commercially under the designation HDK® H2000 from Wacker Chemie AG, D-Munich). When the consistency is homogeneous, a pH of 1.5 is set using 85% strength phosphoric acid. Deionized water is added in stages until a water content of 35 wt % is reached. After 30 minutes, a pH of 6 is set by means of aqueous KOH solution. The preparation is subsequently rendered crosslinkable by addition of 1.6 g of N,N-dibutylaminomethyltriethoxysilane.

Example 2

70 g of the above-prepared particle dispersion B2 are admixed, with continual mixing by means of a planetary dissolver (PC Labotop), with 180 g of a mixture of OH-terminated polydimethylsiloxane having a viscosity of 6000 mPas (available commercially under the name "Polymer 6000" from Wacker Chemie AG, D-Munich), 6 g of a hydrophobized silica (available commercially under the designation HDK® H2000 from Wacker Chemie AG, D-Munich), and 20 g of an MQ resin of the average formula $[(CH_3)_3SiO_{1/2}]_{1.1}[SiO_2]$ having an average molecular weight of 2000 and an average residual ethoxy content of 2.1 weight percent, based on the resin molecule.

When the consistency is homogeneous, a pH of 1.5 is set using about 2 g of 85% strength phosphoric acid. Deionized water is added in stages until a water content of 35 wt % is reached. After 30 minutes dispersion, a pH of 6 is set by means of aqueous KOH solution. The preparation is subsequently rendered crosslinkable by addition of 1.6 g of N,N-dibutylamino-methyltriethoxysilane.

Example 3

70 g of the above-prepared particle dispersion B2 are admixed, with continual mixing by means of a planetary dissolver (PC Labotop), with 180 g of a mixture of OH-terminated polydimethylsiloxane having a viscosity of 6000 mPas (available commercially under the name "Polymer 6000" from Wacker Chemie AG, D-Munich), 6 g of a hydrophobized silica (available commercially under the designation HDK H2000 from Wacker Chemie AG, D-Munich), and 20 g of aluminum trihydrate (Martinal OL 104 S, from Martinswerke).

When the consistency is homogeneous, a pH of 1.5 is set using about 2 g of 85% strength phosphoric acid. Deionized water is added in stages until a water content of 35 wt % is reached. After 30 minutes dispersion, a pH of 6 is set by means of aqueous KOH solution. The preparation is subsequently rendered crosslinkable by addition of 1.6 g of N,N-dibutylamino-methyltriethoxysilane.

Example 4

Films with a thickness each of 2 mm are produced from the dispersions obtained in examples 1 to 3 by applying the aqueous dispersion to a polytetrafluoroethylene surface and allowing the water to evaporate at room temperature. The dry, elastic films which form were investigated, after 7 days, for their elastomer properties. The results are found in Table 2.

TABLE 2

| Dispersion from | Example 1 | Example 2 | Example 3 |
|---|---|---|---|
| Shore A hardness | 25 | 18 | 40 |
| Tensile strength [N/mm²] | 1.0 | 1.0 | 1.3 |
| Elongation at break [%] | 400 | 600 | 390 |
| Consistency | firm | firm | firm |
| Viscosity*) | | | |
| segment 1 | 2.8 Pa·s | 9.1 Pa·s | 8.2 Pa·s |
| segment 2 | 8700 mPa·s | 280,000 mPas | 55,000 mPa·s |
| segment 3 | 2.5 Pa·s | 12.1 Pa·s | 9.5 Pa·s |

*)The viscosity is determined by means of plate/cone measurements. The measurements took place using a Physika MCR 300 with a PP25 measuring cone and the associated Rheoplus/32 software. Measurement is carried out in the following three segments:
1) Oscillating (0.01% Def, 1 Hz, 60 s)
2) Rotation (10 1/s, 20 s)
3) Oscillating (0.01% Def, 1 Hz, 60 s)

The values reported in each case are the last values per segment.

The invention claimed is:

1. An aqueous crosslinkable dispersion comprising:
(A) at least one organosilicon compound comprising units of the formula $$R_a(OR^1)_bSiO_{(4-a-b)/2} \quad (I),$$

where
R denotes identical or different SiC-bonded hydrocarbon radicals having 1 to 18 carbon atoms which are optionally substituted by halogen atoms, amino groups, ether groups, ester groups, epoxy groups, mercapto groups, cyano groups or (poly)glycol radicals, the (poly)glycol radicals being composed of oxyethylene and/or oxypropylene units,
$R^1$ are identical or different and are hydrogen or optionally substituted hydrocarbon radicals which are optionally interrupted by oxygen atoms,
a is 0, 1, 2, or 3, and
b is 0, 1, 2, or 3,
with the proviso that the sum of a+b is less than or equal to 4,
(B) silicon dioxide particles which are partly wettable with water having a BET surface area of from 50 to 500 m²g,
(C) water,
(D) at least one organosilicon compound comprising at least one unit of the formula $$[A-CR^3_2]_eSiR^2_cY_dO_{(4-c-d-e)/2} \quad (II),$$

where
A are identical or different and denote an organic radical bonded via nitrogen,
$R^2$ are identical or different monovalent, optionally substituted hydrocarbon radicals,
$R^3$ are identical or different and are hydrogen or monovalent, optionally substituted hydrocarbon radicals,
Y are identical or different and are hydrolyzable radicals,
c is 0, 1, 2, or 3,
d is 0, 1, 2, or 3, and
e is 0, 1, or 2, with the proviso that the sum of c+d+e is ≤4 and the organosilicon compound has at least one unit where e is other than 0, and also at least two radicals Y,
wherein the aqueous dispersion is substantially free of liquid or solid organic surface-active substances that are nonparticulate at room temperature under the pressure of the surrounding atmosphere.

2. The aqueous dispersion of claim 1, wherein the particles (B) have an average diameter of 1 to 5000 nm.

3. The aqueous dispersions of claim 1, wherein component (B) is present in an amount of 0.1 to 50 parts by weight, based on 100 parts by weight of dispersion.

4. The aqueous dispersion of claim 1, wherein the organosilicon compounds (D) are silanes of the formula (II) and/or partial hydrolyzates thereof.

5. The aqueous dispersion of claim 1, wherein component (D) is present in an amount of 0.01 to 10 parts by weight, based on 100 parts by weight of the aqueous dispersion.

6. The aqueous dispersion of claim 1, wherein at least one component (E) is present, and comprises fillers other than (B), crosslinking catalysts, adhesion promoters, plasticizers, organic solvents inert relative to the dispersions, pH modifiers, or additives.

7. The aqueous dispersion of claim 1, which has a solids content of 10 to 80 wt %.

8. A process for preparing the aqueous, crosslinkable dispersion of claim 1, comprising mixing the components together.

9. A shaped article produced by crosslinking an aqueous dispersion of claim 1.

10. A shaped article produced by crosslinking an aqueous dispersion prepared by the process of claim 8.

* * * * *